US012225839B2

(12) United States Patent
Susko et al.

(10) Patent No.: US 12,225,839 B2
(45) Date of Patent: Feb. 18, 2025

(54) CROP ROW GUIDANCE SYSTEMS

(71) Applicant: AGCO Corporation, Duluth, GA (US)

(72) Inventors: Alexander Quentin Susko, Jackson, MN (US); Jeffrey Michael Zimmerman, Lake Park, IA (US)

(73) Assignee: AGCO Corporation, Duluth, GA (US)

(*) Notice: Subject to any disclaimer, the term of this patent is extended or adjusted under 35 U.S.C. 154(b) by 301 days.

(21) Appl. No.: 17/804,191

(22) Filed: May 26, 2022

(65) Prior Publication Data
US 2022/0377962 A1 Dec. 1, 2022

Related U.S. Application Data

(60) Provisional application No. 63/194,623, filed on May 28, 2021.

(51) Int. Cl.
A01B 69/00 (2006.01)
A01B 69/04 (2006.01)
G05D 1/00 (2024.01)
G06V 10/42 (2022.01)
G06V 10/88 (2022.01)
(Continued)

(52) U.S. Cl.
CPC .......... *A01B 69/001* (2013.01); *A01B 69/008* (2013.01); *G05D 1/0246* (2013.01); *G06V 10/431* (2022.01); *G06V 10/893* (2022.01); *G06V 20/188* (2022.01); *G06V 20/56* (2022.01)

(58) Field of Classification Search
CPC ... G06V 10/893; G06V 20/20; A01M 7/0042; A01M 21/043; B60W 30/10; G01B 11/026; G05B 19/042
See application file for complete search history.

(56) References Cited

U.S. PATENT DOCUMENTS

| 6,278,918 B1 | 8/2001 | Dickson et al. |
| 2007/0271013 A1 | 11/2007 | Jochem et al. |
| 2017/0228595 A1* | 8/2017 | Wilson ................ G06V 20/20 |

(Continued)

FOREIGN PATENT DOCUMENTS

| CN | 110325929 A | * 10/2019 | .......... G05B 19/042 |
| JP | H101211408 A | 8/1989 | |

(Continued)

OTHER PUBLICATIONS

UK Intellectual Property Office, Search report for related UK Application No. GB2108424.9, dated Apr. 11, 2022.

*Primary Examiner* — Yuri Kan

(57) ABSTRACT

Technologies for guiding an agricultural vehicle through crop rows using a camera and signal processing to locate the crop row or centers of the crop row. The signal processing uses a filter to filter data from images captured by the camera and locates the row or the centers based on the filtered data. The filter is generated based on a signal processing transform and an initial image of the crop row captured by the camera. The filter is applied to subsequent images of the crop row captured by the camera. In some embodiments, the camera includes one lens. For example, monocular computer vision is used in some embodiments. Also, in some embodiments, a central processing unit generates the filter based on the transform and the initial image of the crop row and applies the generated filter to the subsequent images of the row.

17 Claims, 11 Drawing Sheets

(51) Int. Cl.
*G06V 20/10* (2022.01)
*G06V 20/56* (2022.01)

(56) References Cited

U.S. PATENT DOCUMENTS

| | | | |
|---|---|---|---|
| 2019/0154439 A1* | 5/2019 | Binder | G01B 11/026 |
| 2020/0230633 A1* | 7/2020 | Serrat | A01M 21/043 |
| 2021/0132618 A1* | 5/2021 | Van Roekel | B60W 30/10 |
| 2021/0158041 A1 | 5/2021 | Chowdhary et al. | |
| 2022/0211025 A1* | 7/2022 | Smith | A01M 7/0042 |

FOREIGN PATENT DOCUMENTS

| | | | | |
|---|---|---|---|---|
| JP | 2004120700 A | * | 4/2004 | H04N 5/76 |
| WO | 2020/014527 A1 | | 1/2020 | |

* cited by examiner

300

Capturing images of a crop row, one image at a time, by a camera attached to a part of an agricultural vehicle, an implement attached to the agricultural vehicle, or a boom attached to the agricultural vehicle
302

Transmitting image data associated with the captured images over an electronics coupling to a processor (such as a CPU)
304

Generating, by the processor, a filter based on a signal processing transform and initial image data associated with an initial image in the captured images
306

Applying, by the processor, the filter to subsequent image data associated with subsequent images in the captured images to locate crop row centers in the crop row
308

Repeat step 308 for each image of the captured images

Controlling, by a controller, steering of the agricultural vehicle according to the located crop row centers
310

```
Reading the initial image data
(e.g., see FIG. 5 showing a GUI displaying reading in average color of a percentage
of crop rows in a top portion and a bottom portion of the initial image as raw color
signals)
402
```
↓
```
Transforming the initial image data into a frequency domain
(e.g., see the graphs in FIGS. 6 to 7 showing results from using an
FFT on the raw color signals)
404
```
↓
```
Generating the signal processing filter based on the output of the transformation
of the initial image data
406
```

```
Reading image data of one of the subsequent images
(e.g., see FIGS. 9 and 10 showing the raw image data 902 and 1002 from a
subsequent image of the crop row)
802
```
↓
```
Applying the signal processing filter on the read image data of the one subsequent
image (e.g., see the FIGS. 9 to 10 showing the filtered image data 904 and 1004
from the subsequent image of the crop row as well as see FIG 11 showing a GUI
displaying the filtered image data plotted over the crop row)
804
```
↓
```
Saving a central crop row center by saving coordinates of a central signal peak
closest to a center of the one subsequent image
806
```
↓
```
Saving additional crop row centers by saving coordinates of additional peaks closest
to the central signal peak (e.g., see FIG. 12 showing a GUI displaying crop row
centers plotted over the crop row)
808
```
↓
```
Fitting a curve or a line to the saved crop row centers (such as fitting using a second
degree polynomial) and determining a root mean squared error (RMSE) of the fit
(e.g., see FIG. 13 showing a polynomial fit of row centers coordinates)
810
```
↓
```
Estimating a heading error and a cross track at a selected look ahead distance based
on the fit (e.g., see FIG. 14 showing a GUI displaying final heading error for the
vehicle transformed with respect to a subsequent image of the crop row)
812
```
↓
```
Repeating steps 802 to 812 for each subsequent image of the subsequent
images 814
```

FIG. 8

CROP ROW GUIDANCE SYSTEMS

CROSS-REFERENCE TO RELATED APPLICATION

This application claims the benefit of the filing date of U.S. Provisional Patent Application 63/194,623, "Crop Row Guidance Systems," filed May 28, 2021, the entire disclosure of which is incorporated herein by reference.

TECHNICAL FIELD

The present disclosure relates to crop row guidance systems.

BACKGROUND

In general, crop row guidance systems capture images of rows of crops and process the captured images to estimate the position of a vehicle relative to crop rows. Based on the estimated position of crop rows, some crop row guidance systems can control the driving or steering of an agricultural vehicle. Thus, crop row guidance systems are a critical technical component in automating farming of row crops.

The success of driverless agricultural vehicles depends on reliable crop row guidance systems to navigate machinery between crop rows, and many contemporary systems rely on computer vision systems. However, rows of crops are challenging to navigate through a computer vision system. Also, there is great variance in the colors, size and texture of crop rows making it difficult for computer vison systems to be a basis for crop row guidance. Furthermore, ambient lighting differences and variability in weeds make computer vision masking solutions difficult to generalize across different crops or field situations for establishing the location of crop rows.

Even with the aforesaid difficulties, reliable crop row guidance systems using computer vision are being developed. And, such systems are achieving reliable results in some cases. However, the computer vision methods in such systems can be complex and resource intensive. Thus, as least one graphics processing unit (GPU) is used or other resource intensive hardware is used. Also, although crop pixels can be individually assigned to a classification through deep learning methods in a computer vision system, the approach can create over computing of the otherwise cyclical and conserved patterns of crop rows.

Thus, less complicated methods of crop row guidance that use less computing resources or use less expensive and complex computing resources may be needed.

SUMMARY

Described herein are crop row guidance systems and methods (techniques) that can use less expensive or at least less complex computing hardware and software to implement crop row guidance. The systems and methods include technologies for guiding an agricultural vehicle along a row of crops using a camera and signal processing to locate the crop row, row centers of the crop row, or a center line or guiding line of the crop row that provides a look ahead direction for navigating a vehicle about the crop row. The signal processing includes a filter to process data in images captured by the camera and locates the row or other aspects of the row (such as row centers, a center line or a guiding line) based on the processed data.

The filter is generated based on at least one signal processing transform (such as a transform that changes data from a time domain to a frequency domain) and an initial image of the crop row captured by the camera. The filter is then applied to subsequent images of the crop row captured by the camera.

In some embodiments, the camera includes one lens only. For example, monocular computer vision is used in some embodiments. Also, in some embodiments, a processor less complex than a contemporary graphics processing unit (GPU) generates the filter based on the transform and the initial image of the crop row and applies the generated filter to the subsequent images of the row. For instance, in some embodiments, a central processing unit (CPU) generates the filter based on the transform and the initial image of the crop row and applies the generated filter to the subsequent images of the row.

In some embodiments, the application of the filter provides output that is used as input for determining a heading error and a cross track error to provide guidance information for an agricultural vehicle moving along the crop row.

In providing crop row guidance, the systems and methods described herein overcome some technical problems in farming of crops and specifically some technical problems in crop row guidance. Also, the techniques disclosed herein provide specific technical solutions to at least overcome the technical problems mentioned in the background section and other parts of the application as well as other technical problems not described herein but recognized by those skilled in the art.

For example, some embodiments of the technologies described herein provide a method generalizable to corn, soybean, and other row crops that utilizes common signal processing tools to quantify the coordinates of crop row centers using a mono (non-stereo) camera. In some embodiments, the tools include a Fourier transform or a fast Fourier transform (FFT) and a signal processing filter generated from the output of the transform, e.g., a bandpass filter (BF) generated from parameters of the transformed signals.

In some embodiments, crop row center coordinates outputted through the signal processing filter are then fit to a statistical model that captures a relative curvature or direction of a crop row with respect to a heading of an agricultural vehicle. For instance, the coordinates are fit to a statistical model that defines direction of a crop row tangentially with respect to a given look ahead distance from the agricultural vehicle moving about the crop row. Cross track errors of the vehicle relative to the defined direction of the crop row are also estimated from the crop row center coordinates. The use of the signal processing tools make the methods and systems disclosed herein largely impervious to row imperfections and variance in weeds and enable use of the guidance technologies in ambient lighting conditions and crop growth stages where the cyclical row pattern is visible at a lower computational cost and a lower computer hardware cost.

With respect to some embodiments, disclosed herein is an apparatus having a camera and a central processing unit (CPU). The camera has a single lens and the CPU is configured to operate with the camera to implement a monocular computer vision system to determine an attribute of a crop row according to a signal processing filter. The apparatus is configured to attach to an agricultural vehicle, an agricultural implement, or an agricultural boom.

In some embodiments, the determined attribute of the crop row is a crop row center line and the monocular computer vision system uses the crop row center line to provide crop row guidance. The crop row center line is derived from a group of estimated crop row centers of a crop row, in some examples.

In some instances of the apparatus, the camera is configured to capture a plurality of images of the crop row, one image at a time, and transmit image data associated with the captured plurality of images over an electronics coupling to the CPU. In such embodiments, the CPU is configured to generate the signal processing filter based on a signal processing transform and initial image data associated with an initial image in the captured plurality of images. Also, the CPU is configured to transform the initial image data associated with the initial image into a frequency domain, wherein a dominant frequency in an output of the transformation of the initial image data corresponds to a number of rows of crop in the initial image. The CPU is also configured to generate the signal processing filter based on the output of the transformation of the initial image data.

In some examples, the signal processing transform includes a Fourier transform. In some other examples, the signal processing transform includes a discrete Fourier transform (DFT), a discrete-space Fourier transform (DSFT), or a discrete-time Fourier transform (DTFT). In some other examples, the signal processing transform includes a fast Fourier transform (FFT).

In some embodiments, the signal processing filter includes a bandpass filter, and the CPU is configured to identify a lower boundary frequency at a selected decibel of a bandpass in the output of the transformation of the initial image data as well as identify an upper boundary frequency at the selected decibel of the bandpass in the output of the transformation of the initial image data. Also, the CPU is configured to generate the bandpass filter based on the identified lower boundary frequency and the identified upper boundary frequency.

In such embodiments and others, the CPU is configured to apply the signal processing filter to subsequent image data associated with subsequent images in the captured plurality of images to locate the crop row center line, wherein the subsequent images are captured by the camera after the initial image is captured by the camera. The location of the crop row center line is derived from estimated crop row centers, in some examples.

Also, in some embodiments, the apparatus is attached to an agricultural vehicle and the CPU is configured to estimate a direction of the agricultural vehicle with respect to a direction of the located crop row center line based on the located crop row center line and a signal sent from a sensor that senses a physical quality related to the direction of the agricultural vehicle when the agricultural vehicle is moving. Further, the CPU is configured to transmit the estimated direction of the agricultural vehicle to a controller of the agricultural vehicle to steer the agricultural vehicle according to the estimated direction of the agricultural vehicle with respect to the direction of the crop row center line.

With some other examples, a vehicle heading error is determined and used. In such embodiments, the apparatus is attached to an agricultural vehicle and the CPU is configured to estimate a direction of the agricultural vehicle with respect to a direction of the located crop row center line based on the located crop row center line and a signal sent from a sensor that senses a physical quality related to the direction of the agricultural vehicle when the agricultural vehicle is moving as well as determine a vehicle heading error according to the estimated direction of the agricultural vehicle with respect to the direction of the located crop row center line. In such examples, the CPU is configured to transmit the determined vehicle heading error to a controller of the agricultural vehicle to steer the agricultural vehicle according to the determined vehicle heading error.

With respect to some embodiments, disclosed herein are computerized methods for crop row guidance, as well as a non-transitory computer-readable storage medium for carrying out technical operations of the computerized methods. The non-transitory computer-readable storage medium has tangibly stored thereon, or tangibly encoded thereon, computer readable instructions that when executed by one or more devices (e.g., one or more personal computers or servers) cause at least one processor to perform a method for crop row guidance.

For example, in some embodiments, a method includes capturing a plurality of images of a crop row, one image at a time, by a camera. The camera is attached to a part of an agricultural vehicle, an implement attached to the agricultural vehicle, or a boom attached to the agricultural vehicle. The method also includes transmitting image data associated with the captured plurality of images over an electronics coupling to a central processing unit (CPU). Also, the method includes generating, by the CPU, a filter based on a signal processing transform and initial image data associated with an initial image in the captured plurality of images. Also, the method includes applying, by the CPU, the filter to subsequent image data associated with subsequent images in the captured plurality of images to locate a crop row center in the crop row. The subsequent images are captured by the camera after the initial image is captured by the camera. In some embodiments, the method includes controlling, by a controller, steering of the agricultural vehicle according to the located crop row center. And, in some examples, the camera and the CPU implement a monocular computer vision system to provide crop row guidance.

With respect to some embodiments, a system includes a camera, including a single lens and configured to attach to a receiving part of an agricultural vehicle, an implement attached to the agricultural vehicle, or a boom attached the agricultural vehicle. The camera is also configured to capture a plurality of images of crop rows, one image at a time, after the camera has been attached to the receiving part as well as transmit image data associated with the plurality of images over an electronics coupling to a CPU. The CPU is configured to generate a filter based on a signal processing transform and initial image data associated with an initial image in the captured plurality of images. And, the CPU is configured to apply the filter to subsequent image data associated with subsequent images in the captured plurality of images to locate a crop row center in a crop row of the crop rows. The subsequent images are captured by the camera after the initial image is captured by the camera. In some examples, the system includes a controller configured to control steering of the agricultural vehicle according to the located crop row center.

These and other important aspects of the invention are described more fully in the detailed description below. The invention is not limited to the particular methods and systems described herein. Other embodiments can be used and changes to the described embodiments can be made without departing from the scope of the claims that follow the detailed description.

BRIEF DESCRIPTION OF THE DRAWINGS

The present disclosure will be understood more fully from the detailed description given below and from the accompanying drawings of various embodiments of the disclosure.

FIGS. 3, 4, and 8 illustrate example methods for crop row guidance, in accordance with some embodiments of the present disclosure.

DETAILED DESCRIPTION OF EXAMPLE EMBODIMENTS

Details of example embodiments of the invention are described in the following detailed description with reference to the drawings. Although the detailed description provides reference to example embodiments, it is to be understood that the invention disclosed herein is not limited to such example embodiments. But to the contrary, the invention disclosed herein includes numerous alternatives, modifications and equivalents as will become apparent from consideration of the following detailed description and other parts of this disclosure.

Figure 1:
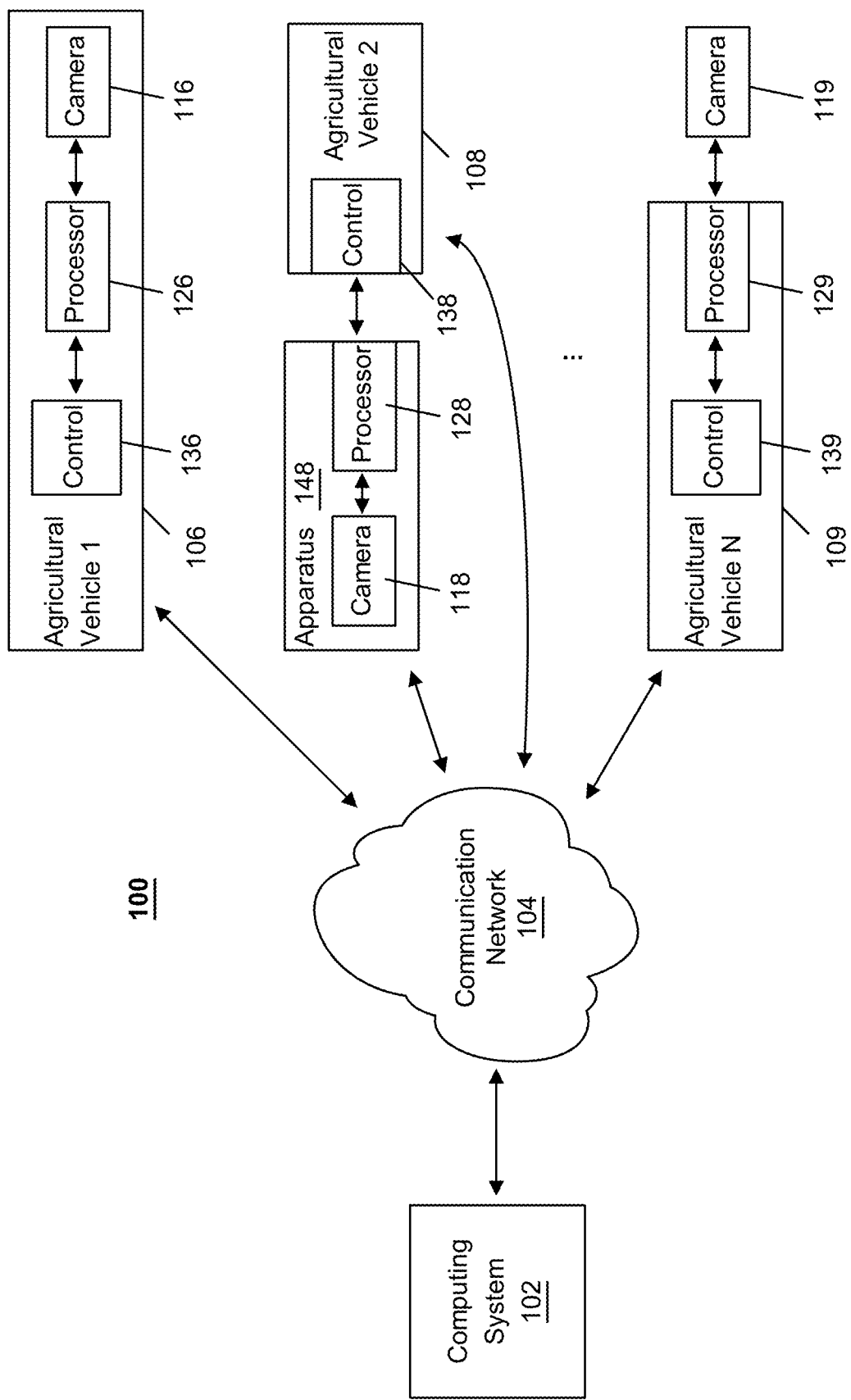
FIG. 1 illustrates an example network of agricultural vehicles as well as systems and apparatuses that provide crop row guidance to the agricultural vehicles, in accordance with some embodiments of the present disclosure.

FIG. 1 illustrates network 100 including at least one computing system (e.g., see computing system 102), a communication network 104, and agricultural vehicles, e.g., see agricultural vehicles 106, 108, and 109. An agricultural vehicle of the network 100 is a tractor, a combine harvester, a truck, or any other type of vehicle used in farming. As shown, a vehicle of the network 100 includes or is connected to a camera (e.g., see cameras 116, 118, and 119) and a processor, such as a CPU (e.g., see processors 126, 128, and 129). Also, as shown, a vehicle of the network 100 includes a vehicle controller (e.g., see controllers 136, 138, and 139). Also, in some embodiments, a vehicle of the network 100 includes a computing system as a part of or in addition to the controller.

In some embodiments, a processor, a controller or a computing system of the network 100 or a sensor of the network (e.g., see processors 126, 128, and 129, controllers 136, 138, and 139 and cameras 116, 118, and 118) is configured to communicate with an external computing system (e.g., see computing system 102) through a communication network (e.g., see communication network 104). Also, in some embodiments, the controllers or computing systems of the vehicles of the network 100 include a processor, memory, a communication interface and one or more sensors that make the vehicles individual computing devices (e.g., see agricultural vehicles 106, 108, and 109). Furthermore, in some embodiments, a computing system of a crop row guidance apparatus that is attachable to an agricultural vehicle of the network 100 includes a processor, memory, a communication interface and one or more sensors that make the crop row guidance apparatus an individual computing device (e.g., see apparatus 148 which is shown including processor 128 and camera 118). The agricultural vehicles of the network 100 are either integrated with or connected to crop row guidance apparatuses or systems, in accordance with some embodiments of the present disclosure.

As shown in FIG. 1, some embodiments include an apparatus having at least a camera and a processor, such as a CPU (e.g., see apparatus 148). In such embodiments, the apparatus is communicatively coupled to a controller or computing system of an agricultural vehicle (e.g., see agricultural vehicle 108). In some other embodiments, the apparatus is integrated into the computing system of the vehicle (e.g., see agricultural vehicle 106 having a system include the controller 136, the processor 126, and the camera 116). In some other embodiments, the apparatus is separated into a system where the camera is its own apparatus the processor and controller are a part of the agriculture vehicle (e.g., see agricultural vehicle 109 and camera 119). In such instances, the camera can communicatively couple to an interface of the computing system of the vehicle.

Also, in some examples, the camera has a single lens (e.g., the camera only has one lens) and the processor is configured to operate with the camera to implement a monocular computer vision system to determine an attribute of a crop row according to a signal processing filter. In some examples, the processor only includes a CPU.

In some examples, the apparatus is configured to attach to an agricultural vehicle, an agricultural implement, or an agricultural boom.

In some embodiments, the determined attribute of the crop row is a crop row center line and the monocular computer vision system uses the crop row center line to provide crop row guidance. The crop row center line is derived from a group of estimated crop row centers of a crop row, in some examples (e.g., see sub-steps 810 and 812 shown in FIG. 8).

In some instances of the apparatus, the camera is configured to capture a plurality of images of the crop row, one image at a time, and transmit image data associated with the captured plurality of images over an electronics coupling to the processor (e.g., see steps 302 and 304 shown in FIG. 3). In such embodiments, the processor is configured to generate the signal processing filter based on a signal processing transform and initial image data associated with an initial image in the captured plurality of images (e.g., see step 306 shown in FIG. 3). Also, the processor is configured to transform the initial image data associated with the initial image into a frequency domain, wherein a dominant frequency in an output of the transformation of the initial image data corresponds to a number of rows of crop in the initial image (e.g., see sub-step 404 shown in FIG. 4). The CPU is also configured to generate the signal processing filter based on the output of the transformation of the initial image data (e.g., see sub-step 406 shown in FIG. 4).

In some examples, the signal processing transform includes a Fourier transform, a discrete Fourier transform (DFT), a discrete-space Fourier transform (DSFT), a discrete-time Fourier transform (DTFT), or a fast Fourier transform (FFT). In some embodiments, the signal processing filter includes a bandpass filter, and the CPU is configured to identify a lower boundary frequency at a selected decibel of a bandpass in the output of the transformation of the initial image data as well as identify an upper boundary frequency at the selected decibel of the bandpass in the output of the transformation of the initial image data. Also, the CPU is configured to generate the bandpass filter based on the identified lower boundary frequency and the identified upper boundary frequency. E.g., see step 408 shown in FIG. 4.

In such embodiments and others, the CPU is configured to apply the signal processing filter to subsequent image data associated with subsequent images in the captured plurality of images to locate the crop row center line, wherein the subsequent images are captured by the camera after the initial image is captured by the camera (e.g., see FIG. 8). The location of the crop row center line is derived from estimated crop row centers, in some examples (e.g., see sub-steps 810 and 812 shown in FIG. 8).

Also, in some embodiments, the apparatus is attached to an agricultural vehicle and the CPU is configured to estimate a direction of the agricultural vehicle with respect to a direction of the located crop row center line based on the located crop row center line and a signal sent from a sensor that senses a physical quality related to the direction of the agricultural vehicle when the agricultural vehicle is moving. Further, the CPU is configured to transmit the estimated direction of the agricultural vehicle to a controller of the agricultural vehicle to steer the agricultural vehicle according to the estimated direction of the agricultural vehicle with respect to the direction of the crop row center line. E.g., see step 310 shown in FIG. 3.

With some examples (e.g., see FIG. 8), the apparatus is attached to an agricultural vehicle and the CPU is configured to estimate a direction of the agricultural vehicle with respect to a direction of the located crop row center line based on the located crop row center line and a signal sent from a sensor that senses a physical quality related to the direction of the agricultural vehicle when the agricultural vehicle is moving and determine a vehicle heading error according to the estimated direction of the agricultural vehicle with respect to the direction of the located crop row center line. In such examples, the CPU is configured to transmit the determined vehicle heading error to a controller of the agricultural vehicle to steer the agricultural vehicle according to the determined vehicle heading error. E.g., see step 310 shown in FIG. 3 as well as sub-step 812 shown in FIG. 8.

Also, in some examples, an agricultural vehicle or a crop row guidance apparatus or system is or includes an individual networked computing device. In the case of the communication network 104 including the Internet, such an agricultural vehicle or a crop row guidance apparatus or system is considered an Internet of Things (IoT) device.

The network 100 includes various types of sensors (e.g., see cameras 116, 118, and 119). In some embodiments, the sensors also include position sensors, linear displacement sensors, angular displacement sensors, pressure sensors, load cells, or any other sensor useable to sense physical attributes of an agricultural vehicle related to steering or driving of the vehicle. One of the cameras can be used in a crop row guidance system that is configured to guide a vehicle connected to the camera. Output of the guidance system combined with output of other sensors of the vehicle, which sense physical attributes of the vehicle related to steering or driving of the vehicle, are used as inputs for steering and driving control of the vehicle, in some embodiments. In some embodiments, a computing system, such as the computing system 200 shown in FIG. 2, is configured to implement the control of the steering or driving of the vehicle according to crop row guidance information and information sensed from sensors that sense physical attributes of the vehicle related to steering or driving of the vehicle.

The communication network 104 includes one or more local area networks (LAN(s)) or one or more wide area networks (WAN(s)). In some embodiments, the communication network 104 includes the Internet or any other type of interconnected communications network. In some embodiments, the communication network 104 includes a single computer network or a telecommunications network. In some embodiments, the communication network 104 includes a local area network (LAN) such as a private computer network that connects computers in small physical areas, a wide area network (WAN) to connect computers located in different geographical locations, or a middle area network (MAN) to connect computers in a geographic area larger than that covered by a large LAN but smaller than the area covered by a WAN.

As shown, at least each shown component of the network 100 (including computing system 102, communication network 104, and agricultural vehicles 106, 108, and 109) is or includes or is connected to a computing system that includes memory that includes media. The media includes or is volatile memory components, non-volatile memory components, or a combination of thereof. In general, each of the computing systems includes a host system that uses memory. For example, the host system writes data to the memory and reads data from the memory. The host system is a computing device that includes a memory and a data processing device. The host system includes or is coupled to the memory so that the host system reads data from or writes data to the memory. The host system is coupled to the memory via a physical host interface. The physical host interface provides an interface for passing control, address, data, and other signals between the memory and the host system.

Figure 2:
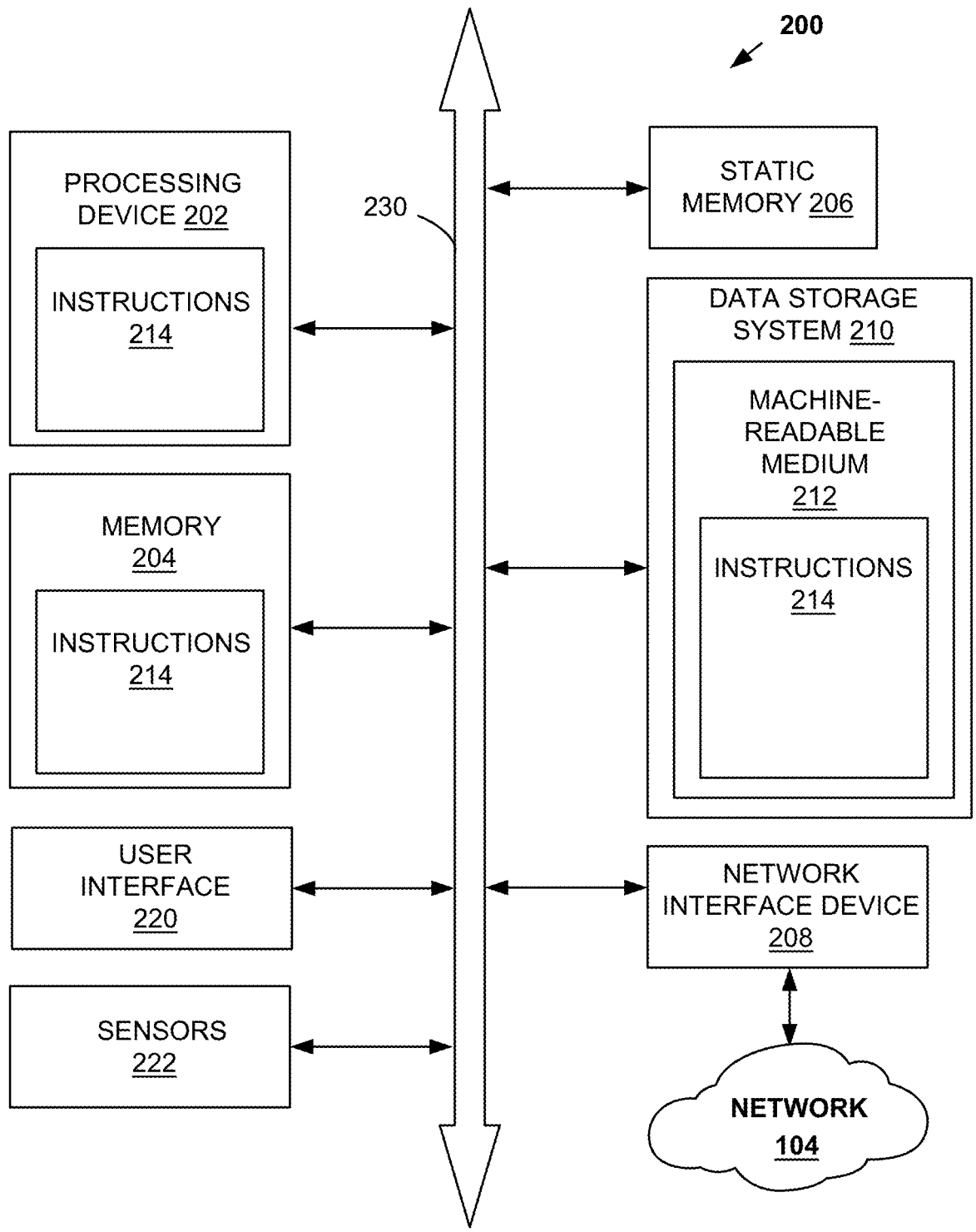
FIG. 2 illustrates a block diagram of example aspects of an external computing system (such as shown by computing system 102 in FIG. 1) or a computing system locally connected to or integrated with a networked apparatus or vehicle (such as the apparatuses and vehicles shown in FIG. 1, e.g., see agricultural vehicles 106, 108, and 109 and apparatus 148), in accordance with some embodiments of the present disclosure. In some embodiments, some of the aspects shown in FIG. 2 are parts of an agricultural vehicle that, in part, directly or indirectly, provide crop row guidance and control steering of the vehicle.

FIG. 2 shows a block diagram of example aspects of the computing system 200, which can be aspects of an external computing system (such as computing system 102 shown in FIG. 1), a computing system integrated with an agricultural vehicle or a separate crop row guidance apparatus, or a computing system that has at least one part that is attachable to an agricultural vehicle.

FIG. 2 illustrates parts of the computing system 200 within which a set of instructions, for causing the machine to perform any one or more of the methodologies discussed herein, are executed. In some embodiments, the computing system 200 corresponds to a host system that includes, is coupled to, or utilizes memory or is used to perform the operations performed by any one of the computing devices, data processors, user interface devices, and sensors described herein. In alternative embodiments, the machine is connected (e.g., networked) to other machines in a LAN, an intranet, an extranet, or the Internet. In some embodiments, the machine operates in the capacity of a server or a client machine in client-server network environment, as a peer machine in a peer-to-peer (or distributed) network environment, or as a server or a client machine in a cloud computing infrastructure or environment. In some embodiments, the machine is a personal computer (PC), a tablet PC, a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computing system 200 includes a processing device 202, a main memory 204 (e.g., read-only memory (ROM), flash memory, dynamic random-access memory (DRAM), etc.), a static memory 206 (e.g., flash memory, static random-access memory (SRAM), etc.), and a data storage system 210, which communicate with each other via a bus 230.

The processing device 202 represents one or more general-purpose processing devices such as a microprocessor, a central processing unit, or the like. More particularly, the processing device is a microprocessor or a processor implementing other instruction sets, or processors implementing a combination of instruction sets. Or, the processing device 202 is one or more special-purpose processing devices such as an application specific integrated circuit (ASIC), a field programmable gate array (FPGA), a digital signal processor (DSP), network processor, or the like. The processing device 202 is configured to execute instructions 214 for performing the operations discussed herein. In some embodiments, the computing system 200 includes a network interface device 208 to communicate over the communication network 104 shown in FIG. 1.

The data storage system 210 includes a machine-readable storage medium 212 (also known as a computer-readable medium) on which is stored one or more sets of instructions 214 or software embodying any one or more of the methodologies or functions described herein. The instructions 214 also reside, completely or at least partially, within the main memory 204 or within the processing device 202 during execution thereof by the computing system 200, the main memory 204 and the processing device 202 also constituting machine-readable storage media.

In some embodiments, the instructions 214 include instructions to implement functionality corresponding to any one of the computing devices, data processors, user interface devices, I/O devices, and sensors described herein. While the machine-readable storage medium 212 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Also, as shown, computing system 200 includes user interface 220 that includes a display, in some embodiments, and, for example, implements functionality corresponding to any one of the user interface devices disclosed herein. A user interface, such as user interface 220, or a user interface device described herein includes any space or equipment where interactions between humans and machines occur. A user interface described herein allows operation and control of the machine from a human user, while the machine simultaneously provides feedback information to the user. Examples of a user interface (UI), or user interface device include the interactive aspects of computer operating systems (such as graphical user interfaces), machinery operator controls, and process controls. A UI described herein includes one or more layers, including a human-machine interface (HMI) that interfaces machines with physical input hardware such as keyboards, mice, or pads, and output hardware such as monitors, speakers, and printers. In some embodiments, such a UI also includes a device that implements an HMI—also known as a human interface device (HID). In some examples, UI described herein include tactile UI (touch), visual UI (sight), auditory UI (sound), olfactory UI (smell), or gustatory UI (taste). In some embodiments, UI include composite user interfaces (CUIs), which are UIs that interact with two or more human senses. In some embodiments, a graphical user interface (GUI), which is composed of a tactile UI and a visual UI capable of displaying graphics, or any other type of UI presents information to a user of the system related to systems and methods for crop row guidance. In some embodiments, sound is added to a GUI, such that the UI is a multimedia user interface (MUI) that provides information related to systems and methods for crop row guidance. UI described herein also include virtual reality or augmented reality aspects, in some examples.

Also, as shown, computing system 200 includes sensors 222 that implement functionality corresponding to any one of the sensors or cameras disclosed herein (e.g., see cameras 116, 118, and 119). In some embodiments, the sensors 222 include a camera or another type of optical instrument that implement functionality of a camera in any one of the methodologies described herein. In some embodiments, the sensors 222 include a device, a module, a machine, or a subsystem that detect objects, events or changes in its environment and send the information to other electronics or devices, such as a computer processor or a computing system in general. In some embodiments, the sensors 222 additionally include a position sensor, a linear displacement sensor, an angular displacement sensor, a pressure sensor, a load cell, or any other sensor useable to sense a physical attribute of an agricultural vehicle related to driving and steering of the vehicle, or any combination thereof.

In some embodiments, a system of the technologies described herein includes a controller of an agricultural vehicle. The system also includes one or more sensors and cameras of the vehicle connected to the controller. In some embodiments, the combination of the sensor(s) and camera(s) as well as the controller perform the steps of the methods described herein to provide crop row guidance and control of driving or steering of an agricultural vehicle according to the crop row guidance. In some embodiments, the determined crop row guidance information is outputted to the operator, via a user interface (UI), such as via user interface 220. The output to the operator is provided in real time during operation of the vehicle, for example. In some embodiments, the determined information is determined using machine learning or the determined information is enhanced via machine learning. The signal processing described herein also incorporates machine learning in some embodiments.

The information determined by the controller or a computing device of or communicatively coupled to the controller lets an operator of the vehicle driving along a crop row know that the crop row is being followed effectively or efficiently. In some embodiments, the information provides whether the operator of the vehicle is driving too fast or too slowly or steering away from the crop row. The information possibly reduces time to perform an agricultural task implemented via an agricultural vehicle and gives the operator more control over the steering of the vehicle. In some embodiments, the information collected by the system is also used to generate a map of the effectiveness or efficiency of the steering or driving of the vehicle integrated with locations of crop rows in a crop field. Also, in some embodiments, the information collected by the system is used as feedback to improve the signal processing described herein or the crop row guidance described herein.

In some examples, the informational output is displayed to a user via a UI to enhance operations of the vehicle manually or is used as feedback information to the controller so that the controller automatically enhances operations of the vehicle with or without manual input. E.g., see FIG. 14, which is an illustration of GUI providing a tangent line at a look ahead distance (shown as an asterisk), plotted over a corresponding image of crop rows, to provide guidance to an operator of a vehicle driving over the crop rows shown in the image.

FIGS. 3, 4, and 8 illustrate example method 300, example sub-steps of step 306 of method 300, and example sub-steps of step 308 of method 300, in accordance with some embodiments of the present disclosure. In some embodiments, the computing steps of method 300, the computing sub-steps of step 306, and the computing sub-steps of step 308 are implementable through a processor and a programming language and numeric computing environment that allows matrix manipulations, plotting of functions and data, and implementation of algorithms (such as a PYTHON program or another type of standalone executable configured to perform and implement the aforesaid functionality).

Method 300 starts with step 302, which includes capturing images of a crop row, one image at a time, by a camera attached to a part of an agricultural vehicle, an implement attached to the agricultural vehicle, or a boom attached to the agricultural vehicle (e.g., see cameras 116, 118, and 119 shown in FIG. 1 as well as sensors 222 shown in FIG. 2). In some embodiments, the agricultural vehicle is a tractor, a combine harvester, a truck, or any other type of vehicle used in farming.

Method 300 continues with step 304, which includes transmitting image data associated with the captured images over an electronics coupling to a processor, such as a CPU (e.g., see processors 126, 128, and 129 as well as processing device 202). Method 300 then continues with step 306, which includes generating, by the processor, a filter based on a signal processing transform and initial image data associated with an initial image in the captured images. FIG. 4 shows example sub-steps of step 306 that are utilized in some embodiments.

Figure 5:
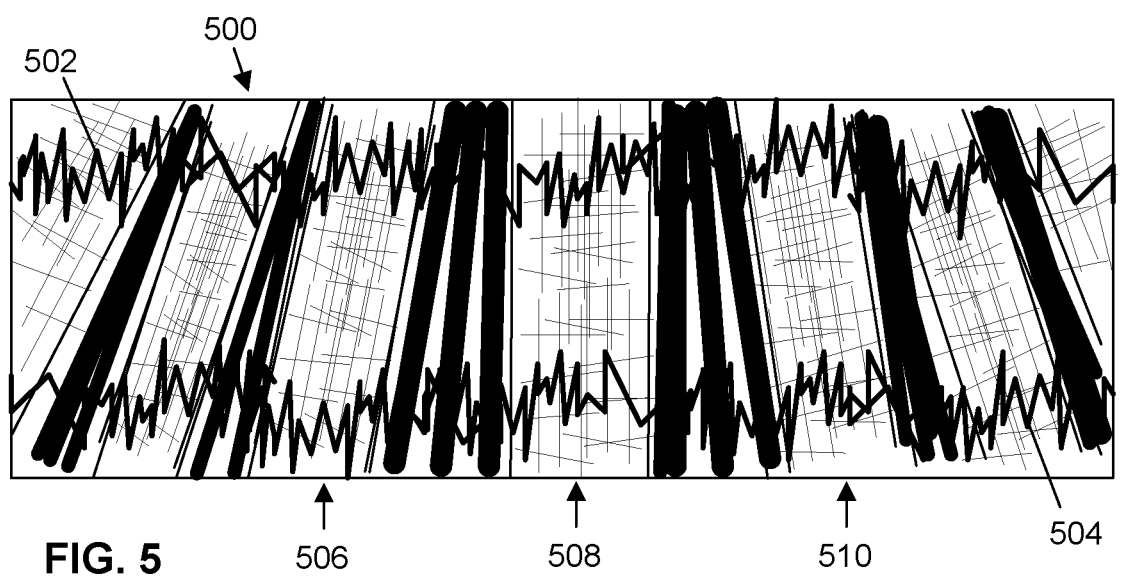
FIG. 5 illustrates original color channel signals in a top and bottom percentage of an image of crop rows plotted over the image with some graphical aspects of the image removed to simplify illustration of labeled elements, in accordance with some embodiments of the present disclosure.

As shown in FIG. 4, step 306 includes sub-step 402, which includes reading, by the processor, the initial image data. As an example, FIG. 5 shows a GUI 500 displaying reading in average color of a percentage of crop rows in a top portion and a bottom portion of the initial image as raw color signals 502 and 504, respectively. In the GUI 500, the raw color signals are plotted over an image of crop rows (e.g., see crop rows 506, 508, and 510).

In some embodiments, step 306 begins with reading in the first frame of a video to identify the number of crop rows in the frame and to design a bandpass filter or another type of filter for applying to subsequent frames. In some examples, in step 306 and sub-step 402, the first frame is read as an RGB image. In a selected color channel of the image, two signals of the selected channel's color values are obtained by taking the mean color channel value of the top and bottom predetermined percentage of image rows. The signals have the same length as the image (E.g., see the image in FIG. 5).

Figure 6:
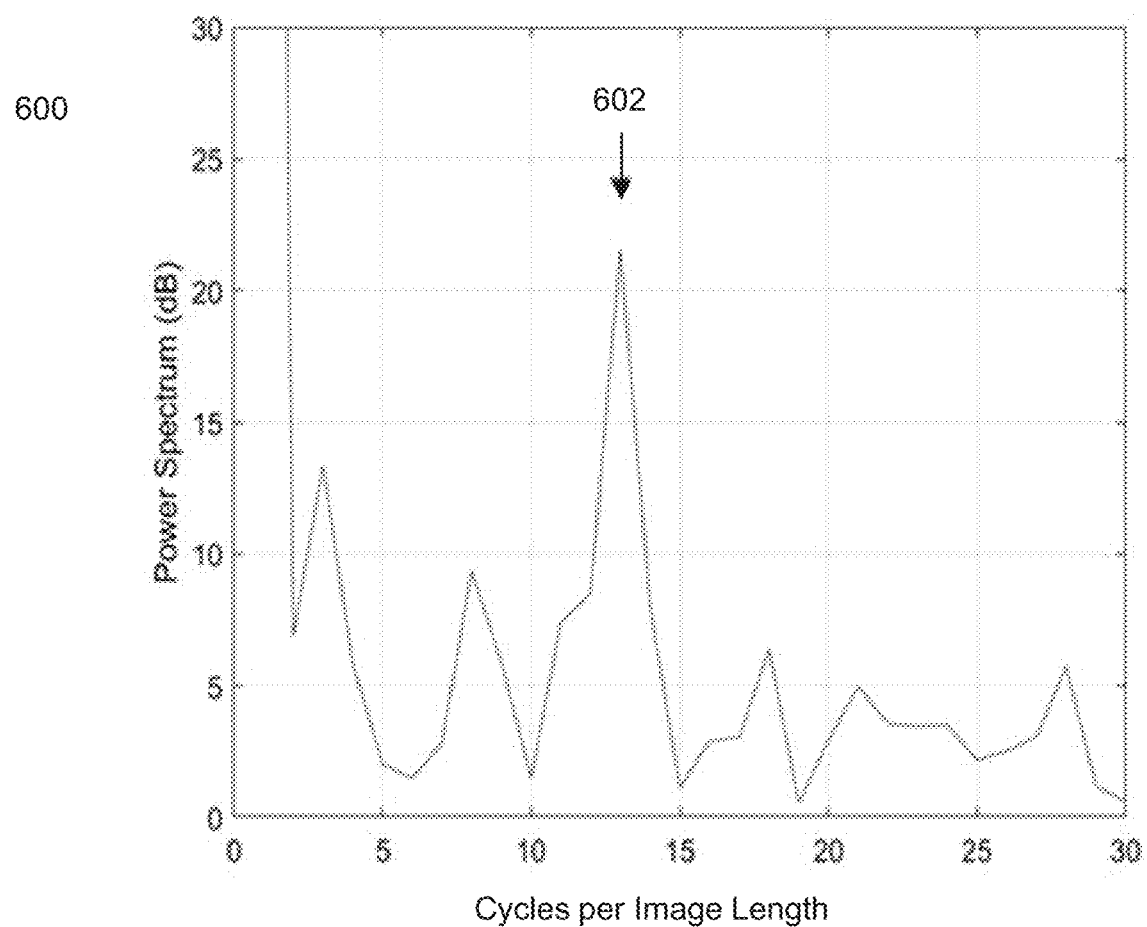
FIGS. 6 and 7 illustrate respective outputs of a signal processing transformation of the original signals shown in FIG. 5, with the highest amplitude in power spectrum being related to the number of rows in the image, in accordance with some embodiments of the present disclosure.
Figure 7:
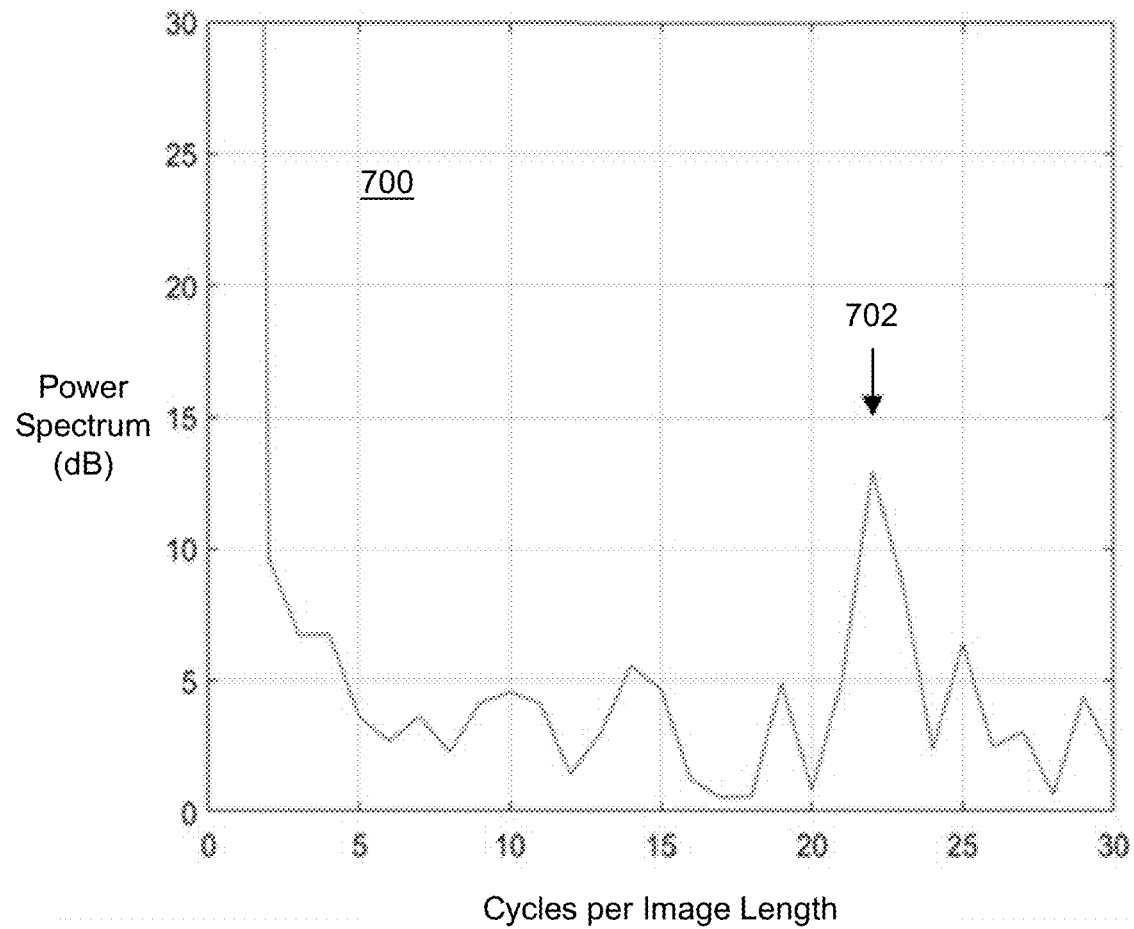

As shown in FIG. 4., step 306 also includes sub-step 404, which includes transforming, by the processor, the initial image data into a frequency domain. As an example, FIGS. 6 to 7 show results 600 and 700, with highest amplitude in power spectrum related to number of rows 602 and 702. The results shown in FIGS. 6 to 7 are from using an FFT on the raw color signals shown in FIG. 5. In the aforesaid illustrative example, a FFT is performed on the selected color channel signals from a top and bottom predetermined percentage of rows in the image. The sampling rate for the signal is related to the length of the image. The peak selected color channel amplitude in the power spectrum (e.g., in the frequency domain) of the selected color channel FFT is related to the number of rows in view in the top (e.g., see FIG. 6) and bottom (e.g., see FIG. 7) predetermined percentage of rows in the image. In the example, the crop rows contain the largest amount of amplitude in the selected color channel across the image length.

FIG. 4 also shows that step 306 includes sub-step 406, which includes generating, by the processor, the signal processing filter based on the output of the transformation of the initial image data. In the aforesaid illustrate example, the number of rows in the top and bottom image signals obtained from the FFT is used to design a BF based on normalized frequencies using the total number of rows in a bottom predetermined percentage of the image for the bottom (e.g., the bottom 50% percent of the image), and the total number of rows in a top predetermined percentage of the image for the top (e.g., the top 50% percent of the image). E.g., see FIGS. 9 to 11. In some examples, the number of rows is used as the lower pass, while the upper pass is set at three times the number of rows for both the top and bottom filter designs. The BF signal (e.g., see image data 904 and 1004 shown in FIGS. 9 and 10) has reduced noise with peaks corresponding to crop rows (e.g., see image data 1102 show in FIG. 11).

Method 300 then continues with step 308, which includes applying, by the processor, the filter to subsequent image data associated with subsequent images in the captured images to locate crop row centers in the crop row. As shown in FIG. 3, step 308 is repeated for each image of the captured images. In the illustrative example shown in FIGS. 9 to 14, the method continues at step 308 with the signal processing approach applied to each subsequent frame in video to provide heading of the agricultural vehicle and cross track error.

Figure 9:
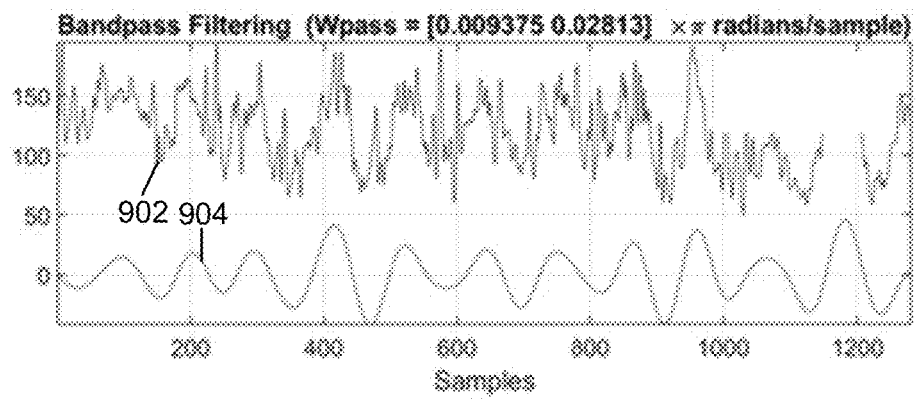
FIGS. 9 and 10 illustrate example graphs each showing an original image signal outputted from initial signal processing and a filtered signal that is the output of a signal processing filter applied to the initial-processed image signal (showing smoothed signals of the rows with reduced noise), in accordance with some embodiments of the present disclosure.
Figure 10:
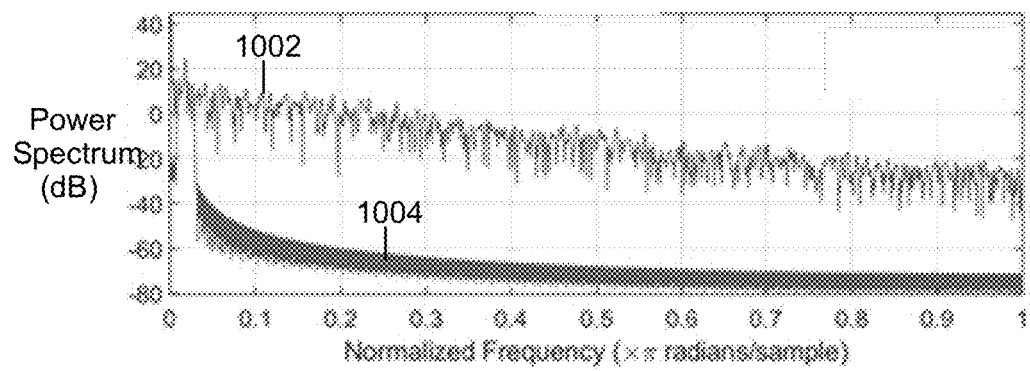

FIG. 8 shows example sub-steps of step 308 that are utilized in some embodiments. As shown in FIG. 8, step 308 includes sub-step 802, which includes reading, by the processor, image data of one of the subsequent images. As an example, FIGS. 9 and 10 show the raw image data 902 and 1002 from a subsequent image of the crop row before the filter has been applied to the data.

Figure 11:
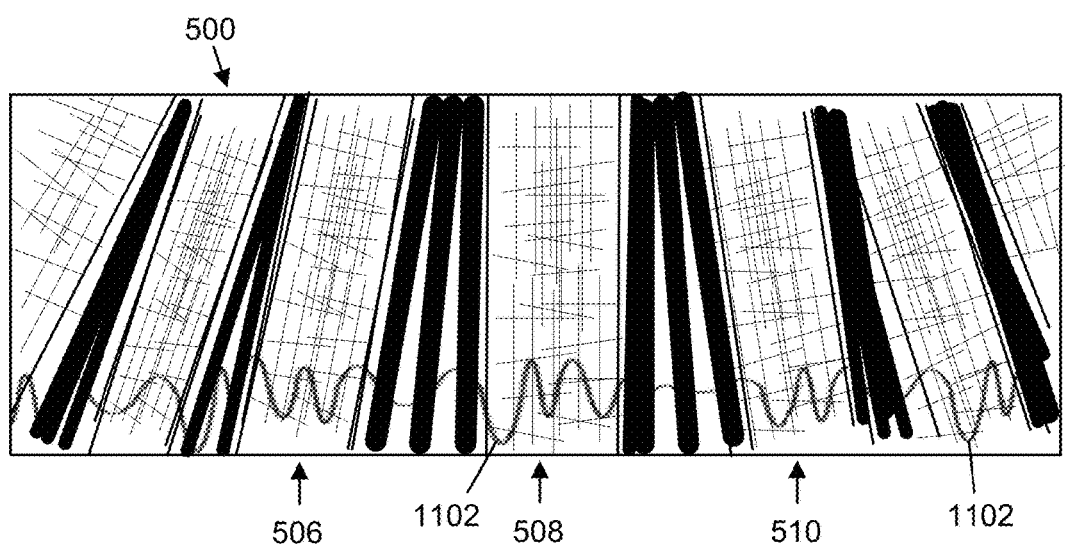
FIG. 11 illustrates an output of the signal processing filter after original channel signals (such as the signals shown in FIG. 5) are processed through the filter, wherein the output is plotted over the image of crop rows with some graphical aspects of the image removed to simplify illustration of labeled elements, and wherein aspects in accordance with some embodiments of the present disclosure are shown.

Also, as shown in FIG. 8, step 308 includes sub-step 804, which includes applying, by the processor, the signal processing filter on the read image data of the one subsequent image. As an example, FIGS. 9 to 10 show the filtered image data 904 and 1004 from the subsequent image of the crop row. FIG. 11 shows a GUI 500 displaying the filtered image data 1102 plotted over the image of the crop rows.

Figure 12:
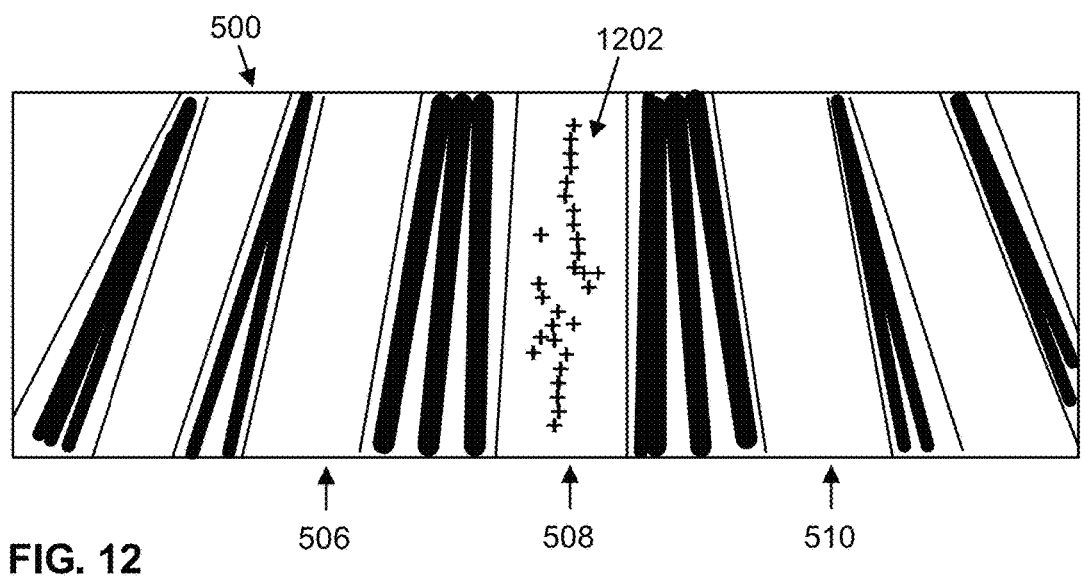
FIG. 12 illustrates crop row centers plotted over an image of crop rows with some graphical aspects of the image removed to simplify illustration of labeled elements, in accordance with some embodiments of the present disclosure.

FIG. 8 also shows step 308 including sub-step 806, which includes saving, by the processor, a central crop row center by saving coordinates of a central signal peak closest to a center of the one subsequent image. FIG. 8 also shows step 308 including sub-step 808, which includes saving, by the processor, additional crop row centers by saving coordinates of additional peaks closest to the central signal peak. As an example, FIG. 12 shows GUI 500 displaying crop row centers 1202 of crop row 508 plotted over the image of the crop rows and specifically plotted over crop row 508. In FIG. 12, the crop row centers 1202 are labeled with respective plus signs ("+").

In the illustrative example in some of the drawings, the frame is read as an RGB image at sub-step 802. A function is called to split the frame by rows into row increments that represent a predetermined percentage of the total rows in the image. The raw signal in the selected color channel is obtained for each predetermined percentage of rows. On each of the row sections in the image, the appropriate BF design obtained from first frame is applied. The peak on the BF signal closest to the image center is recorded, with corrections applied if the nth point is far removed from the nth-1 point (e.g., see FIG. 12).

Figure 13:
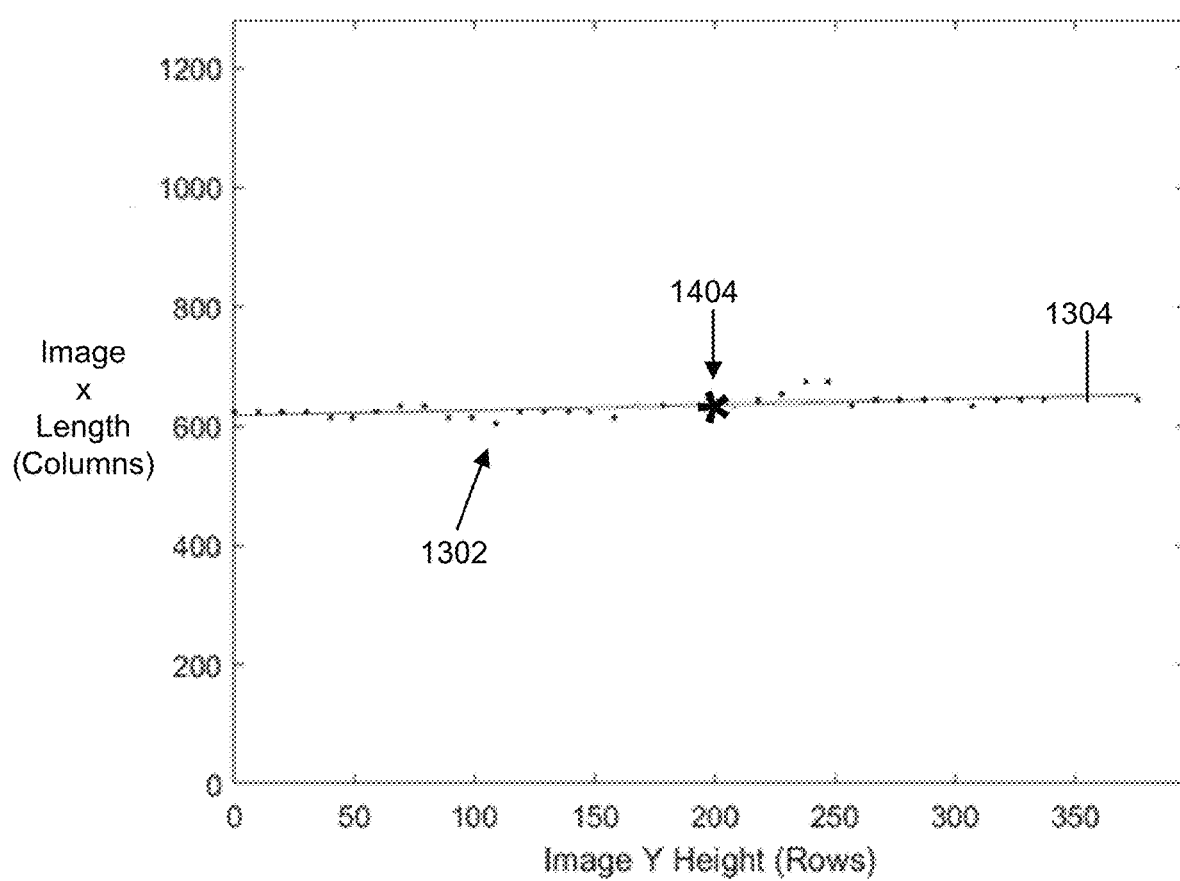
FIG. 13 illustrates a polynomial fit of rotated crop row center coordinates with a tangent line at a look ahead distance shown as an asterisk, such as from the crop row centers plotted in FIG. 12, in accordance with some embodiments of the present disclosure.

FIG. 8 also shows step 308 including sub-step 810, which includes fitting, by the processor, a curve or a line to the saved crop row centers. In some embodiments, the fitting is implemented using a second degree polynomial. Also, sub-step 810 includes determining, by the processor, a root mean squared error (RMSE) of the fit. As an example, FIG. 13 shows a polynomial fit of row centers coordinates 1302.

In the illustrative example in some of the drawings, the peak center coordinates within the image are flipped so that a second degree polynomial can be fit. The variance of the peak observations from the fitted polynomial curve are used to estimate the RMSE of the row center data, which can be used as a threshold for accepting the model fit (e.g., see FIG. 13 as well as Equations 1 and 2).

Equation 1 is a polynomial fit of row center coordinates, with x representing the rotated image y height (rows) coordinates and p(x) the rotated image×length (columns) coordinates.

$$p(x) = p_1 x^2 + p_2 x + p_3 \quad \text{Equation 1}$$

Equation 2 is a RMSE estimation from the Equation 1 fit of row center coordinates.

$$RMSE = \sqrt{\sum_{i=1}^{N} \frac{(p(x) - y_{obs})^2}{N}} \quad \text{Equation 2}$$

Figure 14:
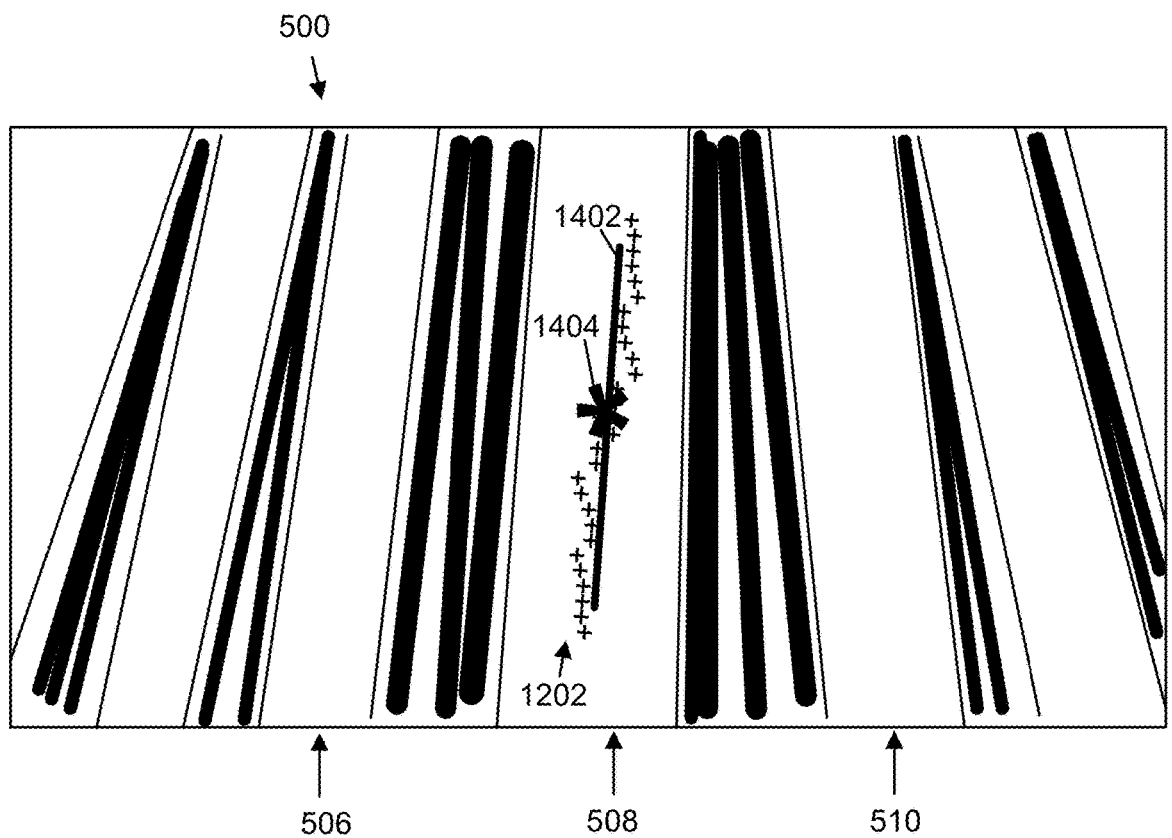
FIG. 14 illustrates the polynomial fit of row center coordinates shown in FIG. 13, with the tangent line at the look ahead distance shown as an asterisk, plotted over the image of crop rows with some graphical aspects of the image removed to simplify illustration of labeled elements, in accordance with some embodiments of the present disclosure.

FIG. 8 also shows step 308 including sub-step 812, which includes estimating, by the processor, a heading error and a cross track at a selected look ahead distance of the agricultural vehicle based on the fit. As an example, FIG. 14 shows the GUI 500 displaying final heading error 1402 for the vehicle transformed with respect to a subsequent image of the crop row 508. The final heading error 1402 is or is related to a tangent line 1304 (shown in FIG. 13) at a look ahead distance 1404 shown as an asterisk. The look ahead distance 1404 is also shown in FIG. 13 as an asterisk.

Figure 15:
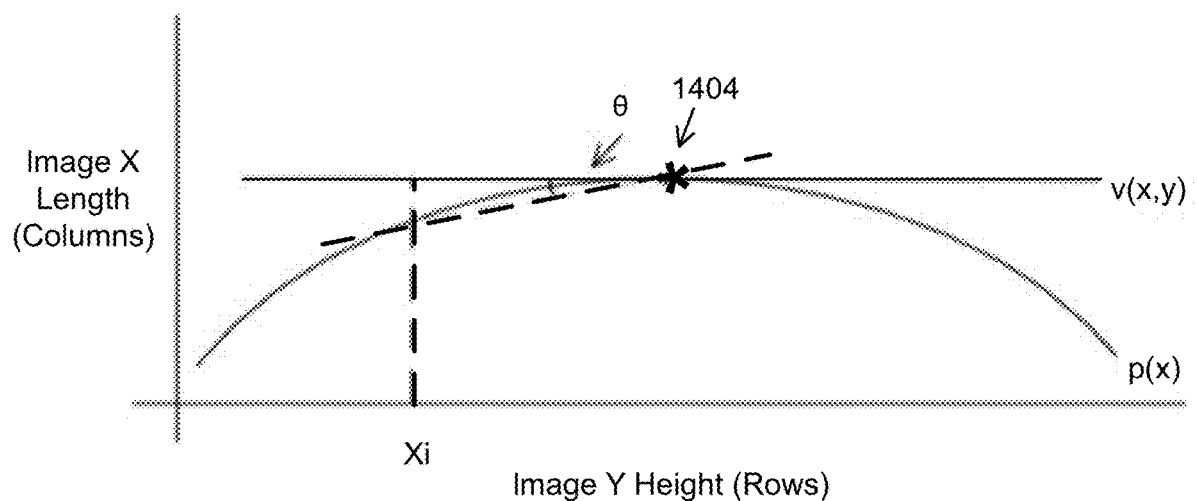
FIG. 15 illustrates the final heading error for an agricultural vehicle transformed with respect to the image, in accordance with some embodiments of the present disclosure.

In the illustrative example in some of the drawings, a look ahead distance in the image is defined where the cross track and heading errors are to be estimated. The heading error is estimated from the polynomial fit of the row center data at the look ahead distance x by obtaining the value of the first derivative of the polynomial at the look ahead distance x, extending this line tangentially, and estimating its tangent angle θ within the image (e.g., see FIGS. 13 and 14 and as well as Equations 3 to 5). The cross track error is computed as the distance (e.g., in pixels) of the polynomial fit at the look ahead distance x (e.g., see FIG. 15 and as well as Equation 6)

Equation 3 is a first derivative of Equation 1 for obtaining heading error at a look ahead distance x.

$$p(x)' = 2p_1 x + p_2 \quad \text{Equation 3}$$

Equation 4 is a tangent vector spanning a selected range of pixels (PXLS) from look ahead distance x with a slope given by Equation 3.

$$v(x,y) = p(x)'[x - \text{PXLS}:x + \text{PXLS}] + (p(x) - p(x)'x) \quad \text{Equation 4}$$

Equation 5 is a tangent angle θ estimation of a crop row with respect to the image using point xi as the x coordinate where tangent vector v(x,y) intersects a vertical line at a predetermined pixel row above the look ahead distance x in the image.

$$\theta = \sin^{-1} \frac{(p(x) - x_i)}{\sqrt{(p(x) - x_i)^2 + 10^2}} \quad \text{Equation 5}$$

Equation 6 is a cross track error estimation at a look ahead distance from an image center (image×length (Columns)) C.

$$CT = C - p(x) \quad \text{Equation 6}$$

FIG. 8 also shows step 308 including sub-step 812, which includes repeating, by the processor, sub-steps 802 to 812 for each subsequent image of the subsequent images captured by the camera.

Finally, method 300 continues with step 310, which includes controlling, by a controller, steering of the agricultural vehicle according to the located crop row centers (e.g., see controller 136, 138, and 139 as well as computing system 200).

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a predetermined result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that these and similar terms are to be associated with the appropriate physical quantities and are merely convenient labels applied to these quantities. The present disclosure can refer to the action and processes of a computing system, or similar electronic computing device, that manipulates and transforms data represented as physical (electronic) quantities within the computing system's registers and memories into other data similarly represented as physical quantities within the computing system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computing system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computing system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

While the invention has been described in conjunction with the specific embodiments described herein, it is evident that many alternatives, combinations, modifications and variations are apparent to those skilled in the art. Accordingly, the example embodiments of the invention, as set forth herein are intended to be illustrative only, and not in a limiting sense. Various changes can be made without departing from the spirit and scope of the invention.

What is claimed is:

1. An apparatus, comprising:
    a camera, comprising a single lens; and
    a central processing unit (CPU) operably coupled to the camera and comprising:
    at least one processor; and
    at least one non-transitory computer-readable storage medium storing instructions thereon that, when executed by the at least one processor, cause the CPU to:
    receive image data of at least one crop row from the camera, the image data comprising a plurality of images of the at least one crop row;
    generate a signal processing filter based on a signal processing transform and initial image data of an initial image of the plurality of images of the at least one crop row of the image data;
    apply the signal processing filter to subsequent image data of subsequent images of the plurality of images to determine an attribute of the at least one crop row, wherein the subsequent images are captured by the camera after the initial image is captured by the camera;
    wherein the (CPU) controls steering of an agricultural vehicle, via a controller of the agricultural vehicle, based at least partially on the determined attribute of the at least one crop row.

2. The apparatus of claim 1, wherein the apparatus is configured to be attached to the agricultural vehicle, an agricultural implement, or an agricultural boom.

3. The apparatus of claim 1, wherein determining the attribute of the at least one crop row comprises determining a crop row center line of the at least one crop row, and wherein causing the controller to control steering of the agricultural vehicle comprises utilizing the crop row center line to generate and provide crop row guidance.

4. The apparatus of claim 3, wherein the camera is configured to:
    capture the plurality of images of the at least one crop row, one image at a time; and
    transmit the image data comprising the plurality of images over an electronics coupling to the CPU.

5. The apparatus of claim 1, wherein generating the signal processing filter based on the signal processing transform and the initial image of the at least one crop row of the image data comprises:
    transforming the initial image data associated with the initial image into a frequency domain, wherein a dominant frequency in an output of the transformation of the initial image data corresponds to a number of rows of crop in the initial image; and
    generating the signal processing filter based on the output of the transformation of the initial image data.

6. The apparatus of claim 5, wherein the signal processing transform comprises a Fourier transform.

7. The apparatus of claim 5, wherein the signal processing transform comprises a discrete Fourier transform (DFT), a discrete-space Fourier transform (DSFT), or a discrete-time Fourier transform (DTFT).

8. The apparatus of claim 5, wherein the signal processing transform comprises a fast Fourier transform (FFT).

9. The apparatus of claim 5, wherein the signal processing filter comprises a bandpass filter, and wherein the CPU further comprises instruction that, when executed by the at least one processor, cause the CPU to:

identify a lower boundary frequency at a selected decibel of a bandpass in the output of the transformation of the initial image data;

identify an upper boundary frequency at the selected decibel of the bandpass in the output of the transformation of the initial image data; and generate the bandpass filter based on the identified lower boundary frequency and the identified upper boundary frequency.

10. The apparatus of claim 4, wherein the CPU further comprises instruction that, when executed by the at least one processor, cause the CPU to apply the signal processing filter to the subsequent image data associated with subsequent images of the plurality of images to locate the crop row center line.

11. The apparatus of claim 10, wherein the apparatus is attached to an agricultural vehicle and wherein the CPU further comprises instruction that, when executed by the at least one processor, cause the CPU to estimate a direction in which the agricultural vehicle is traveling with respect to a direction of the located crop row center line based on the located crop row center line and a signal sent from a sensor that senses a physical quality related to the direction in which the agricultural vehicle is traveling when the agricultural vehicle is moving.

12. The apparatus of claim 11, wherein the CPU further comprises instruction that, when executed by the at least one processor, cause the CPU to transmit the estimated direction in which the agricultural vehicle is traveling to a controller of the agricultural vehicle to steer the agricultural vehicle according to the estimated direction in which the agricultural vehicle is traveling with respect to the direction of the crop row center line.

13. The apparatus of claim 10, wherein the apparatus is attached to an agricultural vehicle and wherein the CPU further comprises instruction that, when executed by the at least one processor, cause the CPU to:

estimate a direction in which the agricultural vehicle is traveling with respect to a direction of the located crop row center line based on the located crop row center line and a signal sent from a sensor that senses a physical quality related to the direction in which the agricultural vehicle is traveling when the agricultural vehicle is moving; and determine a vehicle heading error according to the estimated direction in which the agricultural vehicle with respect to the direction of the located crop row center line.

14. The apparatus of claim 13, wherein the CPU further comprises instruction that, when executed by the at least one processor, cause the CPU to transmit the determined vehicle heading error to a controller of the agricultural vehicle to steer the agricultural vehicle according to the determined vehicle heading error.

15. A method, comprising:

capturing a plurality of images of a crop row, one image at a time, by a camera attached to a part of an agricultural vehicle, an implement attached to the agricultural vehicle, or a boom attached to the agricultural vehicle;

transmitting image data associated with the captured plurality of images over an electronics coupling to a central processing unit (CPU);

generating, by the CPU, a filter based on a signal processing transform and initial image data associated with an initial image of the crop row in the captured plurality of images;

applying the filter to subsequent image data associated with subsequent images in the captured plurality of images to locate a crop row center in the crop row, wherein the subsequent images are captured by the camera after the initial image is captured by the camera; and controlling, by a controller, steering of the agricultural vehicle according to the located crop row center.

16. The method of claim 15, further comprising utilizing the located crop row center in the crop row to provide crop row guidance.

17. A system, comprising:

a camera, comprising a single lens and configured to:

be attached to an agricultural vehicle, an implement attached to the agricultural vehicle, or a boom attached the agricultural vehicle;

capture a plurality of images of crop rows, one image at a time, after the camera has been attached to the agricultural vehicle; and transmit image data associated with the plurality of images over an electronics coupling;

a central processing unit (CPU), operably coupled to the camera and comprising:

at least one processor; and at least one non-transitory computer-readable storage medium storing instructions thereon that, when executed by the at least one processor, cause the CPU to:

receive the image data from the camera;

generate a filter based on a signal processing transform and initial image data associated with an initial image in the captured plurality of images; and apply the filter to subsequent image data associated with subsequent images in the captured plurality of images to locate a crop row center in a crop row of the crop rows, wherein the subsequent images are captured by the camera after the initial image is captured by the camera; and wherein the (CPU) controls steering of an agricultural vehicle, via a controller of the agricultural vehicle, according to the located crop row center.

* * * * *